United States Patent [19]
Kurata et al.

[11] Patent Number: 5,410,529
[45] Date of Patent: Apr. 25, 1995

[54] OPTICAL PICKUP APPARATUS

[75] Inventors: Yukio Kurata, Tenri; Yukinori Nishitani, Neyagawa; Yoshio Yoshida; Takahiro Miyake, both of Tenri, all of Japan

[73] Assignee: Sharp Kabushiki Kaisha, Osaka, Japan

[21] Appl. No.: 26,177

[22] Filed: Mar. 1, 1993

Related U.S. Application Data

[63] Continuation of Ser. No. 469,265, Jan. 24, 1990, abandoned.

[30] Foreign Application Priority Data

Jan. 27, 1989 [JP]  Japan .................. 1-18022

[51] Int. Cl.⁶ .............................................. G11B 7/135
[52] U.S. Cl. .................................... 369/109; 369/116
[58] Field of Search .............. 369/44.11, 44.12, 44.23, 369/109, 111, 112; 359/563, 566, 572, 573; 358/342; H04N 5/85

[56] References Cited

U.S. PATENT DOCUMENTS

| | | | |
|---|---|---|---|
| 4,766,585 | 8/1988 | Fukumoto et al. | 369/44.24 |
| 4,885,734 | 12/1989 | Yuzo | 369/44.23 |
| 4,945,529 | 7/1990 | Ono et al. | 369/109 |

FOREIGN PATENT DOCUMENTS

| | | | |
|---|---|---|---|
| 0123048 | 10/1984 | European Pat. Off. | |
| 20309689 | 8/1988 | European Pat. Off. | |
| 62-270034 | 5/1986 | Japan . | |
| 63-222340 | 3/1987 | Japan . | |
| 63-222341 | 3/1987 | Japan . | |
| 62-103857 | 5/1987 | Japan | 369/44.12 |
| 62-212940 | 9/1987 | Japan | 369/44.23 |
| 62-236147 | 10/1987 | Japan | 369/44.12 |
| 62-270034 | 11/1987 | Japan . | |

Primary Examiner—Tommy P. Chin
Assistant Examiner—Huy Nguyen

[57] ABSTRACT

An optical pickup apparatus for reading out information from an optical disk. The optical pickup includes a light source; and an optical device having a grating pattern for splitting a light beam from said the source into a zero-order diffracted beam and plus and minus first-order diffracted beams. The grating pattern has the center portion and one or more side portions. The efficiency of the center portion for the zero-order diffracted beam is greater than the efficiency of the side portions for the zero-order diffracted beam.

21 Claims, 4 Drawing Sheets

OPTICAL PICKUP APPARATUS

This application is a continuation of application Ser. No. 07/469,265 filed on Jan. 24, 1990, now abandoned.

BACKGROUND OF THE INVENTION

1. Field of the Invention

This invention relates to an optical pickup apparatus, and more particularly to an optical pickup apparatus which produces a laser beam for reading out information recorded on an information recording medium.

2. Description of the Prior Art

In recent years, optical disks having a high recording density and capable of recording large volumes of information have been finding many uses in various fields of application. Because of the high recording density of an optical disk, an optical pickup device for reading out information from the optical disk is provided with an optical system for focusing the laser beam into a very small spot.

Figure 7:
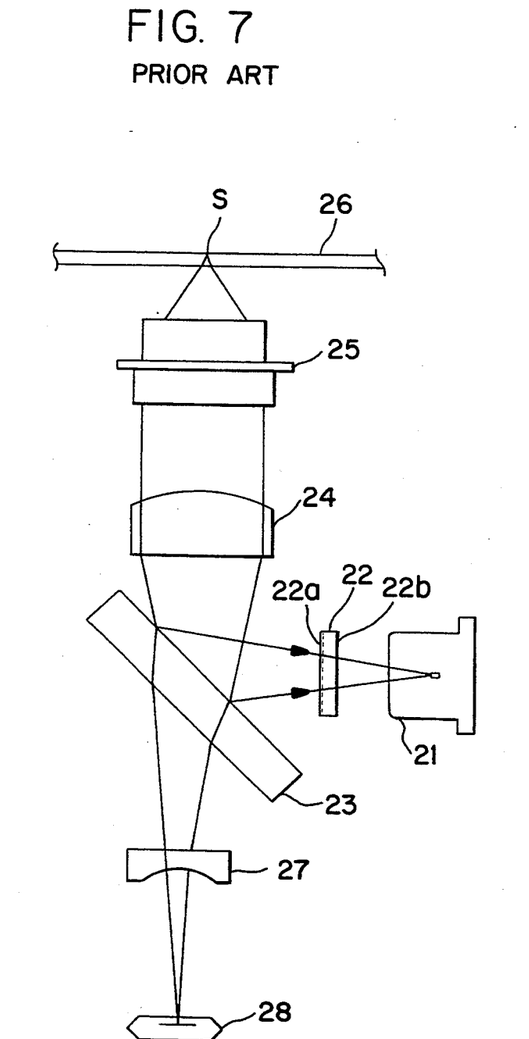
FIG. 7 shows schematically a conventional optical pickup apparatus.
Figure 8:
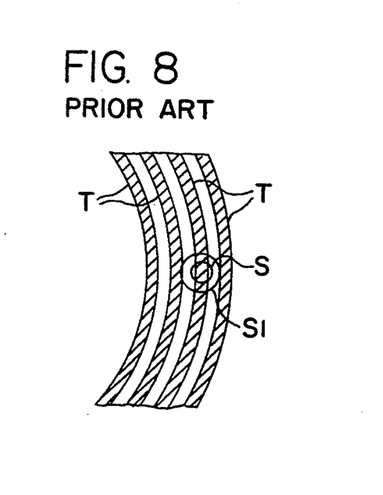
FIG. 8 is a diagram illustrating the positional relationship between a light spot and tracks on an optical disk.

FIG. 7 is a diagram illustrating the construction of a conventional optical pickup apparatus. The optical pickup apparatus of FIG. 7 comprises a laser device 21, a diffraction grating 22, a beam splitter or half mirror 23, a collimating lens 24, an objective lens 25, a plano-concave lens 27, and a photodetector 28, and is used for reading information recorded on an optical disk 26 in which information is stored in the form of pit tracks T (FIG. 8).

In this optical pickup apparatus, a laser beam emitted from the laser device 21 is separated by the diffraction grating 22 into three beams, a zero-order diffracted beam and first-order diffracted beams in the positive and negative directions. Hereinafter, these two first-order diffracted beams are referred to as "plus and minus first-order diffracted beams". The zero-order and first-order diffracted beams are then reflected by the beam splitter 23, converted through the collimating lens 24 into parallel beams, and focused through the objective lens 25 to be projected onto the optical disk 26. The beams reflected from the optical disk 26 pass through the objective lens 25, the collimating lens 24, the beam splitter 23 and the plano-concave lens 27, and impinges onto the photodetector 28 which converts incident light beams into electric signals.

Formed on one surface 22a of the diffraction grating 22 are parallel grooves having a pitch of approximately 30 μm and a depth of approximately 0.3 μm. Two sub-beams (plus and minus diffracted beams) are formed by the parallel grooves. By detecting the difference in the reflection amount between the two subbeams, it is possible to detect whether the zero-order diffracted beam is correctly tracking the center of a recording track on the optical disk 26. The detected signal is also used as a tracking servo signal.

In an optical pickup apparatus described above, since the recording tracks are each formed in a very narrow width of 1 to 2 μm, a laser spot S projected onto the optical disk must be focused into a diameter of approximately 1 μm to match the recording track width. For that purpose, the objective 25 is required to have a high numerical aperture (NA) so that the size of the laser spot S is reduced while increasing the intensity of the beam.

However, if the laser spot S is reduced to an extremely small size, an Airy ring (secondary maximum) $S_1$ is produced around the converged spot S, as shown in FIG. 8. On the other hand, if the Airy ring $S_1$ extends to hit the adjacent recording tracks, the problem of crosstalk is caused.

Figure 9A:
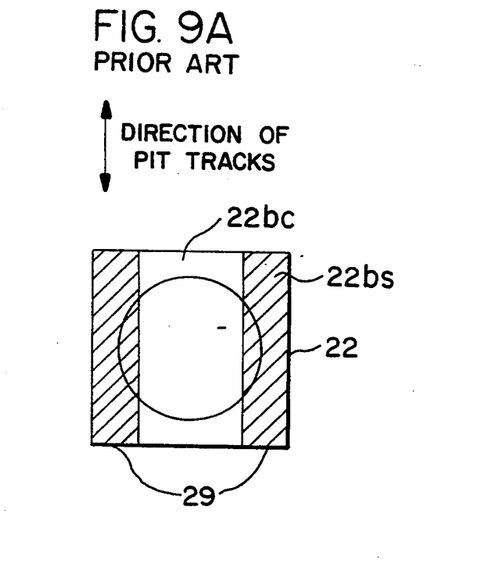
FIG. 9A illustrates a diffraction grating used in the apparatus of FIG. 7.
Figure 9B:
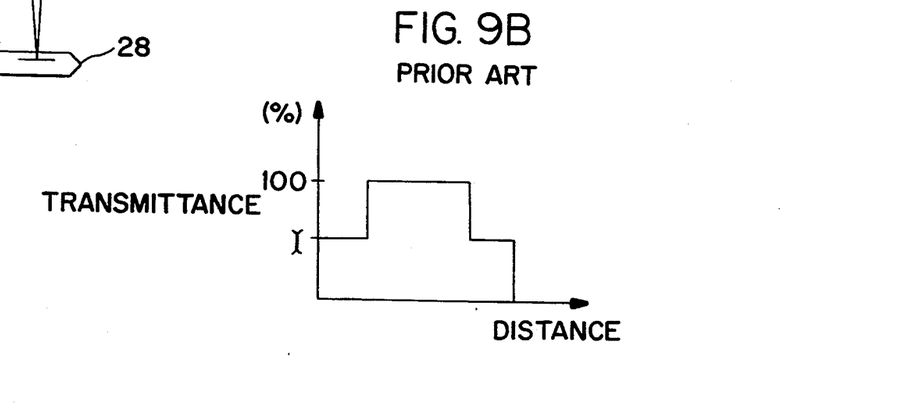
FIG. 9B is a graph of the transmittance of the diffraction grating of FIG. 9A.

To overcome the above-mentioned problem, there has been proposed a configuration in which the diffraction grating 22 is provided with a light attenuation filter or neutral density filter (ND filter) 29 which partially covers the surface 22b opposite to the grating surface 22a (for example, Japanese Laid-open Patent Publication No. 2,270,034). In the prior art optical pickup apparatus, as shown in FIG. 9A, the center portion 22bc not covered by the ND filter 29 has a transmittance which is different from that of side portions 22bs covered by the ND filter 29. More specifically, as shown in FIG. 9B, the center portion 22bc is provided with a transmittance of 100%, while a transmittance of 10 to 40% is set for the side portions 22bs. In FIG. 9A, the laser light spot is indicated by a circle L. By setting the transmittances in this manner, the distribution of the laser beam intensity entering the objective lens 25 can be adjusted so that a laser beam of high intensity is obtained at the center of the spot S while reducing the laser beam intensity at the periphery thereof. This results in a weakened intensity of the Airy ring of the laser spot S, thereby hindering the occurrence of crosstalk even in the case of a narrow recording track width.

In the prior art optical pickup apparatus, however, the amount of the laser beam is partially reduced by the absorption or reflection of light caused by the ND filter 29, resulting in that a partial amount of the laser beam is not used. That is, the utilization efficiency of light in the prior art apparatus is inferior.

SUMMARY OF THE INVENTION

The optical pickup apparatus of this invention, which overcomes the above-discussed and numerous other disadvantages and deficiencies of the prior art, comprises a light source; and an optical device having a grating pattern for splitting a light beam from said light source into a zero-order diffracted beam and plus and minus first-order diffracted beams, said grating pattern has the center portion and one or more side portions, the efficiency of said center portion for the zero-order diffracted beam being greater than the efficiency of said side portions for the zero-order diffracted beam.

In a preferred embodiment, the center portion is surrounded by said side portions.

In a preferred embodiment, the duty ratio of the gratings in said center portion is smaller than that in said side portions.

In a preferred embodiment, the duty ratio of the gratings in said center portion is greater than that in said side portions.

The optical pickup apparatus of this invention, comprises a light source; and an optical device having a grating pattern for separating a light beam from said light source into a zero-order diffracted beam and plus and minus first-order diffracted beams, said three beams being to be focused on an information recording medium having recording tracks, thereby detecting information stored in the recording tracks, said grating pattern has the center portion and one or more side portions, the efficiency of said center portion for the zero-order diffracted beam being greater than the efficiency of said side portions for the zero-order diffracted beam, said center portion elongating in the direction which corresponds to the direction of the recording tracks.

The optical pickup apparatus of this invention, comprises a light source; and an optical device having a grating pattern for separating a light beam from said light source into a zero-order diffracted beam and plus and minus first-order diffracted beams, said grating pattern is formed on one surface of said optical device, and has the center portion and one or more side portions, the efficiency of said center portion for the zero-order diffracted beam being greater than the efficiency of said side portions for the zero-order diffracted beam, and said optical device has a hologram pattern for splitting a light beam incident thereon from the outside, said hologram pattern being formed on the other surface opposite to said one surface.

Thus, the invention described herein makes possible the objectives of (1) providing an optical pickup apparatus which has an excellent utilization efficiency of light; (2) providing an optical pickup apparatus which does not require any ND filter; (3) providing an optical pickup apparatus which can be easily manufactured; and (4) providing an optical pickup apparatus which can be manufactured at a reduced cost.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
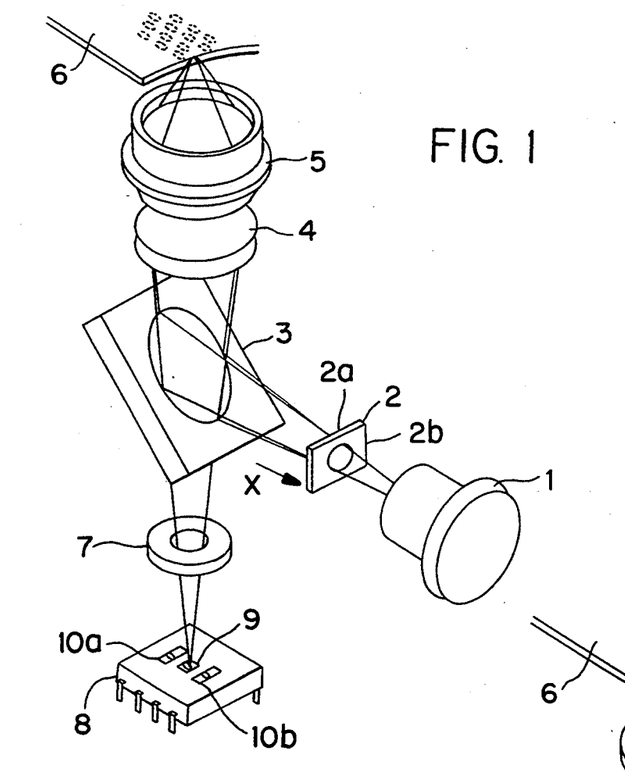
FIG. 1 is a perspective view illustrating an optical pickup apparatus according to the invention.

FIG. 1 illustrates an optical pickup apparatus according to the invention. The optical pickup apparatus of FIG. 1 comprises a laser device 1, a diffraction grating 2, a beam splitter or half mirror 3, a collimating lens 4, an objective lens 5, a plano-concave lens 7, and a photo-detector 8. This apparatus is used for reading information recorded on an optical disk 6. The diffraction grating 2 has a grating pattern formed on one surface 2a, as described later in more detail. The photodetector 8 comprises a first photodetecting element 9 which is divided into four sections, and second and third photodetecting elements 10a and 10b for detecting a tracking servo signal. The first photodetecting element 9 is used for detecting pit signals from the optical disk 6 and for detecting a tracking servo signal.

In this optical pickup apparatus, a laser beam emitted from the laser device 1 is separated by the diffraction grating 2 into three beams, a zero-order diffracted beam and plus and minus first-order diffracted beams. The zero-order and first-order diffracted beams are then reflected by the beam splitter 3, converted through the collimating lens 4 into parallel beams, and then focused through the objective lens 5 to be projected onto the optical disk 6. The beams reflected from the optical disk 6 pass through the objective lens 5, the collimating lens 4, the beam splitter 3 and the plano-concave lens 7, and impinges onto the photodetector 8 which converts the beams into electric signals.

Figure 3A:
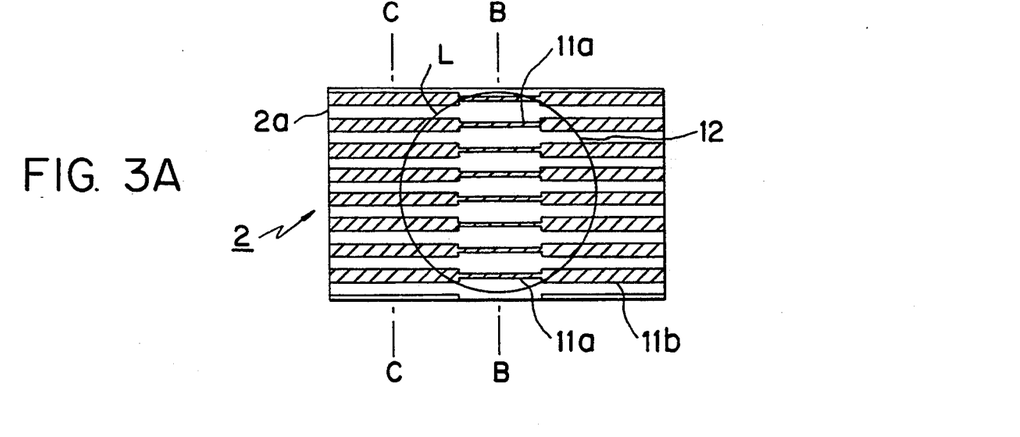
FIG. 3A is a plan view of a diffraction grating of the apparatus of FIG. 1, which is seen from the direction of the arrow X.
Figure 4:
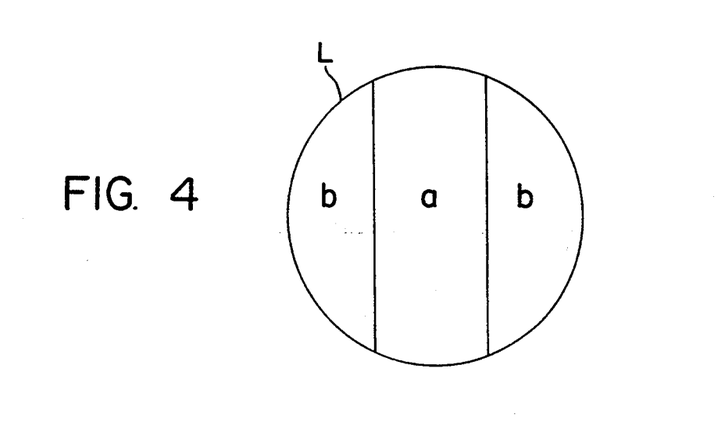
FIG. 4 illustrates diagrammatically the relationship between the center portion and the side portions in the diffraction grating of FIG. 3A.

The diffraction grating 2 is made of glass (having a refractive index of 1.52). as shown in FIG. 3A, the grating pattern formed on the surface 2a of the diffraction grating 2 has narrow-width grooves 11a and wide-width grooves 11b. The narrow-width grooves 11a are positioned at the center portion a, and the wide-width grooves 11b at the side portions b which sandwich the center portion a (FIG. 4). The center portion a has a rectangular shape in a plan view which elongates in the direction of the tracks of the optical disk 6, and is positioned so as to correspond with the track from which information is to be read out.

Figure 3B:
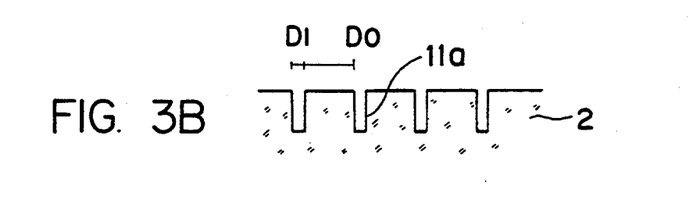
FIG. 3B is a side elevation sectional view taken along the line B—B of FIG. 3A.
Figure 3C:
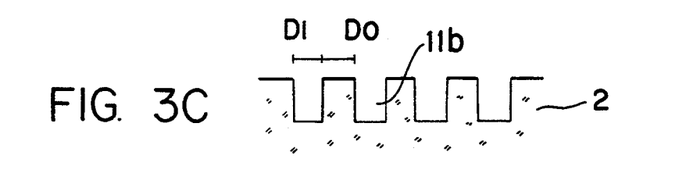
FIG. 3C is a side elevation sectional view taken along the line C—C of FIG. 3A.

In the embodiment, the groove portions 11a and 11b are arranged with the same pitch of 16 $\mu$m. Both the grooves 11a and 11b have the same depth of 0.65 $\mu$m. Between the groove portions 11a and 11b, the ratio (duty ratio) of the projecting portion width $D_0$ to the recessed portion width $D_1$ is different. That is, the duty ratio is set at $D_0:D_1=1:1$ for the wide width grooves 11b in the side portions b as shown in FIG. 3C, while it is set at $D_0:D_1=1:0.157$ for the narrow width grooves 11a in the center portion a as shown in FIG. 3B.

Because of the difference in the duty ratio, the laser beam passing through the center portion a is provided with a reinforced intensity, while that passing through the side portions b comes out with a weakened intensity. The following describes the phenomenon how the difference in the intensity of the transmitted light is caused.

In FIG. 3A, the spot of a laser beam incident on the diffraction grating 2 is indicated by a circle L. FIG. 4 diagrammatically illustrates the positional relation between the center portion a and the side portions b in a light spot L of the laser beam incident from the laser device 1. In the center portion a, the ratio (duty ratio) of the projecting portion width $D_0$ to the recessed portion width $D_1$ is set at $D_0:D_1=1:0.157$, while, in the side portions b, the duty ratio is set at $D_0:D_1=1:1$.

Here, the area of the center portion a in the light spot L is denoted as $S_A$, the sum of the areas of the side portions b in the light spot L as $S_B$, the diffraction efficiencies for the zero-order diffracted beam and plus and minus first-order diffracted beams passing through the portion a as $\eta_{0A}$ and $\eta_{1A}$, respectively, and the diffraction efficiencies for the zero-order diffracted beam and plus and minus first-order diffracted beams passing through the portion b as $\eta_{0B}$ and $\eta_{1B}$, respectively. Also, the ratio of the transmittance of the portion a for a zero-order diffracted beam to that of the portion b is designated as T ($T=\eta_{0B}/\eta_{0A}$), the ratio of the area of the portion a in the light spot L to that of the portion b in the light spot L as $R_S$ ($R_S=S_A/S_B$), and the spectral ratio of the zero-order diffracted beam $I_0$ to the plus and minus diffracted beams $I_1$ as K ($K=I_0/I_1$). Then, the following expressions hold.

$$T=\eta_{0A}/\eta_{0B} \quad (1)$$

$$R_S=S_A/S_B. \quad (2)$$

$$K=(\eta_{0B}S_B+\eta_{0A}S_A)/(\eta_{1B}S_B+\eta_{1A}S_A) \quad (3)$$

From expression (3), the following relation can be obtained.

$$K=(\eta_{0B}+\eta_{0A}S_A/S_B)/(\eta_{1B}+\eta_{1A}S_A/S_B) \quad (4)$$

As described above, the diffraction grating shown in FIGS. 3A to 3C has a duty ratio of $D_1/D_0=0.157$ in the center portion a, and $D_1/D_0=1.0$ in the side portions b, and has the same depth of 0.65 μm in both the portions a and b. Using a known calculation method for finding the diffraction efficiency of a relief-type diffraction grating, $\eta_{0A}=0.682$, $\eta_{1A}=0.054$, $\eta_{0B}=0.232$, and $\eta_{1B}=0.311$ are obtained. As is apparent, the zero-order beam diffraction efficiency $\eta_{0A}$ through the center portion a is greater than the zero-order beam diffraction efficiency $\eta_{0B}$ through the side portions b. From these values of $\eta_{0A}$, $\eta_{1A}$, $\eta_{0B}$, and $\eta_{1B}$, $T(=\eta_{0B}/\eta_{0A})=0.34$ can be obtained. The optimum value of $R_S(=S_A/S_B)$ can be obtained by calculating an Airy ring formed on a disk, using the technique of the diffraction integration. According to the calculation conducted by the Inventors, when T=0.34, the optimum value of $R_S$ is 1.13.

These values of T and $R_S$ are suitable values for reducing the size of an Airy ring which is produced around the converged spot S projected onto the optical disk 6.

Also, by substituting $R_S=1.13$ and the values of $\eta_{0A}-\eta_{1B}$ into expression (4), K=2.7 is found. This value of K shows that the spectral ratio of the zero-order diffracted beam to the plus and minus first-order diffracted beams, i.e., the ratio of the main beam for reading out information from the optical disk 6 to the subbeams for obtaining the tracking servo signal therefrom can be produced in a proper balance.

Figure 3D:
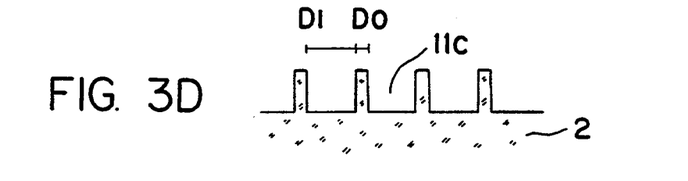
FIG. 3D is a side elevation sectional view illustrating another example of the grating pattern.

In the diffraction grating 2 of the embodiment, the width of the projecting portions is greater than that of the recessed portions ($D_0>D_1$) in the center portion a, but conversely, the width of the recessed portions may be made greater than that of the projecting portions ($D_0<D_1$) in the center portion a, as shown in FIG. 3D. The same effect can be achieved in both the cases. In the latter case, however, grooves must be etched wider as shown by numeral 11c in FIG. 3D, so that it may cause disadvantages that the output of an etching device (e.g., reactive ion etching device) must be larger, and that a longer etching time is required.

Figure 5:
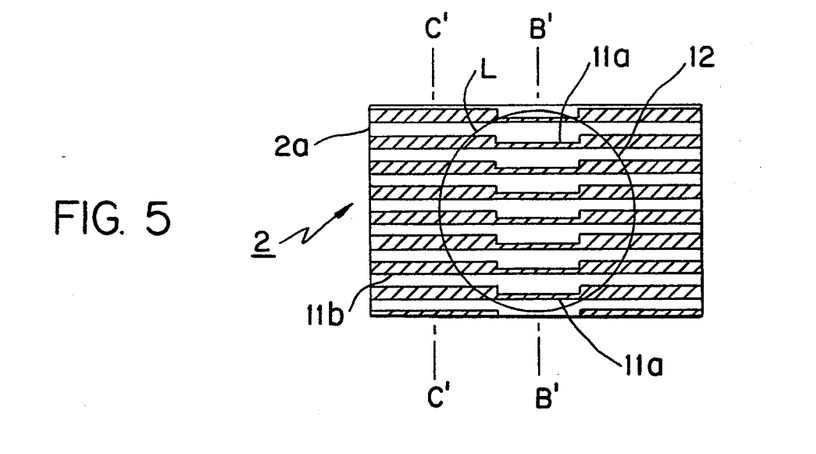
FIG. 5 is a plan view of another diffraction grating according to the invention.

In another embodiment, the diffraction grating 2 has a grating pattern shown in FIG. 5. The grating pattern shown in FIG. 5 is also provided with a different duty ratio of recessed portions to projecting portions between the center portion and the side portions, but each recessed portion in the center portion has one of its boundary surfaces formed flush with one of the boundary surfaces of each recessed portion in the side portions. This pattern provides approximately the same characteristic as the pattern of FIG. 3A, but since it has a fewer number of corners formed therein, the diffraction grating having the pattern of FIG. 5 has the advantage in that the formation of a photomask by the electronic beam drawing technique can be done more easily.

Figure 6A:
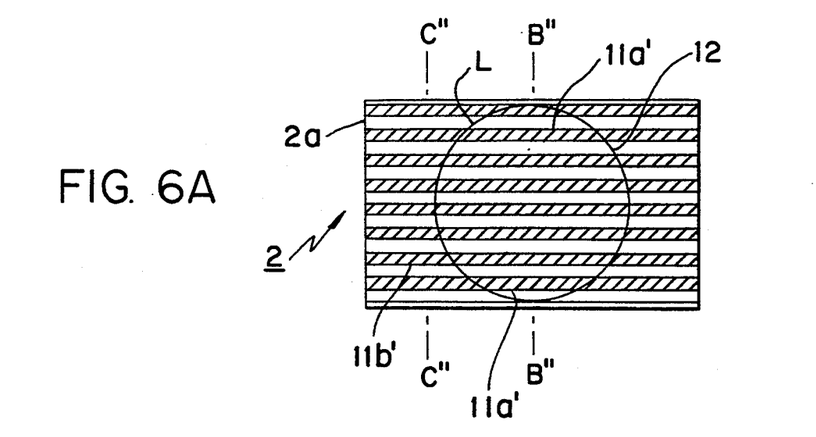
FIG. 6A is a plan view of a further diffraction grating according to the invention.
Figure 6B:
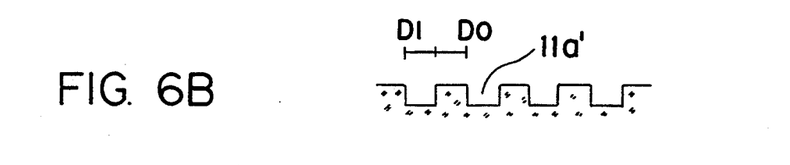
FIG. 6B is a side elevation sectional view taken along the line B"—B" of FIG. 6A.
Figure 6C:
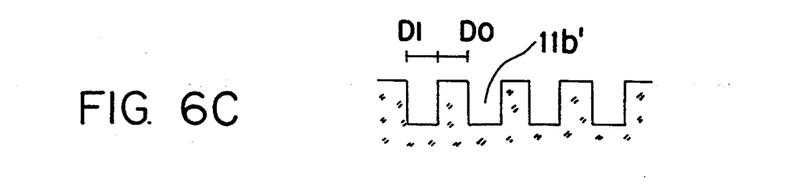
FIG. 6C is a side elevation sectional view taken along the line C"-C" of FIG. 6A.

The diffraction grating 2 may have a grating pattern as shown in FIGS. 6A to 6C. In FIGS. 6A to 6C, the numeral 11a' indicates grooves formed in the center portion of the diffraction grating 2, and the numeral 11b' represents grooves formed in the side portions thereof. These two kinds of grooves 11a' and 11b' are formed in parallel with the same pitch of 16 μm, and the duty ratio of the projection portion width $D_0$ to the recessed portion width $D_1$ is 1:1 for both grooves. However, the grooves 11b' formed in the side portions have a depth sufficiently greater than that of the grooves 11a' formed in the center portion. That is, the depth of the grooves 11a' is set at 0.29 μm, while the depth of the grooves 11b' is set at 0.65 μm. The diffraction grating shown in FIG. 6 can be produced as follows: first, the shallower grooves of 0.29 μm depth are formed over the entire surface of a transparent substrate, and then, with the center portion covered with a mask, the grooves formed in the side portions are etched further up to the depth of 0.65 μm. Using the known calculation method for finding the diffraction efficiency of a relief-type diffraction grating, $\eta_{0A}=0.682$, $\eta_{1A}=0.129$, $\eta_{0B}=0.232$, and $\eta_{1B}=0.311$ are obtained. As is apparent, the diffraction efficiency $\eta_{0A}$ for the zero-order diffracted beam through the center portion is greater than the diffraction efficiency $\eta_{0B}$ for the zero-order diffracted beam through the side portions. From these values of $\eta_{0A}$, $\eta_{1A}$, $\eta_{0B}$, and $\eta_{1B}$, $T(=\eta_{0B}/\eta_{0A})=0.34$ can be obtained. As described above, the optimum value of $R_S$ ($=S_A/S_B$) is 1.13. As in the case of the embodiment of FIG. 3A, These values of T and $R_S$ are suitable ones for reducing the size of an Airy ring which is produced around the converged spot S projected onto the optical disk 6.

By substituting these values into expression (4), K=2.2 is found. This value of K shows that the spectral ratio of the zero-order diffracted beam to the plus and minus first-order diffracted beams, i.e., the ratio of the main beam for reading out information from the optical disk 6 to the subbeams for obtaining the tracking servo signal therefrom can be produced in a proper balance. Moreover, this value of K obtained in this embodiment is superior to those obtained in the embodiments using the grating patterns of FIGS. 3A and 5A.

In the above-described diffraction gratings, the center portion of the grating pattern is formed in a rectangular shape, which allows an Airy ring $S_1$ (the intensity of which is greatly reduced) to be produced on the adjacent recording track, as shown in FIG. 8. If the recording density of the optical disk is such that any presence of an Airy ring on a recording track causes a problem, the grating pattern may be formed in a square or near-square shape by surrounding the center portion with the side portion.

Figure 2:
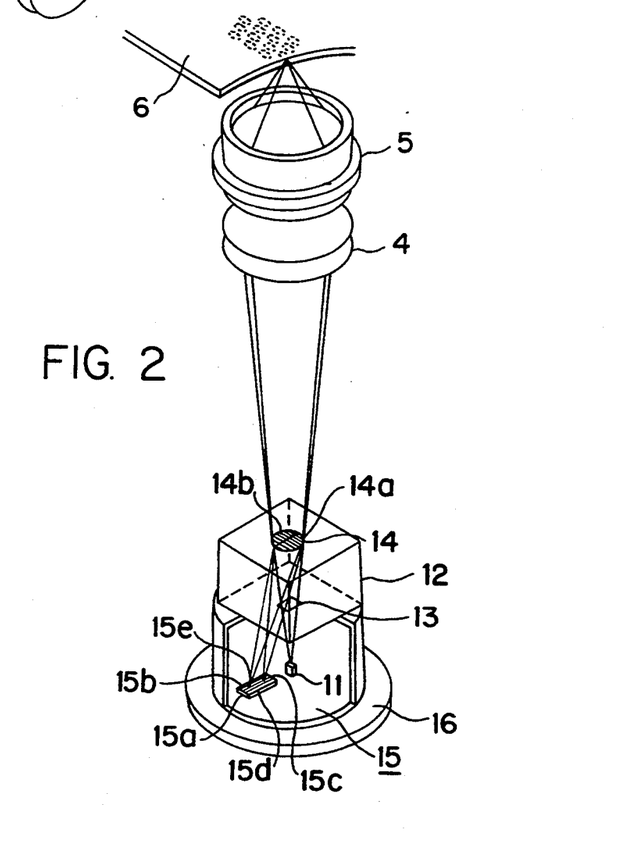
FIG. 2 is a perspective view illustrating another optical pickup apparatus according to the invention.

FIG. 2 shows another optical pickup apparatus according to the invention. The optical pickup apparatus of FIG. 2 comprises a laser device 11 and a photodetector 15 which are housed in a cap 16, and a hologram element 12. The hologram element 12 is made of glass (having a refractive index of 1.52) and has a substantially cubic shape, on the top surface of which grooves are formed by means of etching to form a hologram pattern 14, and on the bottom surface of which grooves are also formed by means of etching to form a grating pattern 13. The hologram element 12 is positioned on the opening of the cap 16 to securely attached thereto. The photodetector 15 consists of five light receiving elements 15a–15e. The laser device 11 and the photodetector 15 are fixed to a stem or heat sink (not shown). The hologram pattern 14 comprises two regions 14a and 14b divided by a center line. Each of the regions 14a and 14b has periodical fine grooves. The period of the grooves in one region is different from that of the grooves formed in the other region. The center line (which does not actually exist as a pattern) is so disposed that its direction coincides with the radial direction of the optical disk 6. The grooves of the hologram pattern 14 are formed in a mildly curved shape in order to correct the aberration. The grating pattern 13 may be the same as any of those illustrated in FIGS. 3A, 5 and 6A.

When the light spot of a laser beam emitted from the laser device 11 is focused on the optical disk 6, the main beam (a zero-order diffracted beam which has been diffracted by the grating pattern 13) is diffracted by the region 14b of the hologram pattern 14 to be converged on the boundary between the light receiving elements 15a and 15b, thereby forming a spot thereon, while the main beam is diffracted by the region 14a to be converged on the light receiving element 15c, thereby forming a spot thereon. The two sub beams diffracted by the hologram pattern 14 (plus and minus first-order diffracted beam which has been diffracted by the grating pattern 13) are converged on the light receiving elements 15d and 15e to form respective spots.

When the output signals from the detectors 15a, 15b, 15c, 15d and 15e are denoted as Sa, Sb, Sc, Sd, and Se, respectively, a pit signal from the optical disk 6 is obtained as Sa+Sb+Sc, a focus error signal as Sa−Sb, and a tracking error signal as Sd−Se. As described above, the grating pattern 13 has a grating which has been described with reference to FIGS. 3A, 5 and 6A. Therefore, the main beam is provided with a reinforced intensity at its center and a weakened intensity at its periphery, so that the intensity of an Airy ring produced around the converged spot on the optical disk 6 can be greatly reduced. In the optical pickup apparatus of FIG. 2, the hologram element 12 conducts multiple functions, i.e., a function to produce the three beams, a function to perform the beam splitting of the reflected beams, and a function to reduce the intensity of an Airy ring of the laser spot.

As described above, according to the present invention, the luminous intensity of an airy ring (secondary maximum) produced around the converged spot on the optical disk can be effectively reduced, thus eliminating the problem of crosstalk which occurs when the Airy ring hits the adjacent recording tracks.

Furthermore, according to the present invention, the pattern of the diffraction grating (grating pattern) for forming three beams is specially designed to function as a filter, which eliminates the need for an addition of a special optical component or a manufacturing process, thus avoiding an increase in production cost. Moreover, unlike a conventional light attenuation filter which accomplishes partial difference in the beam light amount through absorption or reflection of light, since the diffraction grating according to the invention accomplishes the difference in the beam light amount by partially varying the diffraction efficiency, the present invention has a great advantage that the incident light can be effectively utilized without discarding any part thereof.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An optical pickup apparatus comprising:
    a light source for emitting light beams;
    a transparent element having at least two opposed surfaces and having a grating pattern for separating a light beam from said light source into three beams, the first a zero-order diffracted beam, a second and third beams being plus and minus first-order diffracted beams, the grating pattern formed on one of said surfaces,
    means to focus said three beams on an information recording medium having recording tracks, so that information stored in the recording tracks can be detected by photodetector means,
    said grating pattern having a center portion and at least one side portion, an efficiency of said center portion for the zero-order diffracted beam being greater than an efficiency of said side portion for the zero-order diffracted beam, said center portion elongating in the direction which corresponds to the direction of the recording tracks, and
    said transparent element having a hologram pattern for diffracting a light beam incident thereon from the outside, said hologram pattern being formed on an other surface opposite to said one surface,
    wherein a recessed portion of the grating pattern is formed into a rectangular shape in plan view which has a width or depth changing stepwise between said center portion and said side portion to obtain the stepwise change of the transmittance of the grating pattern.

2. An optical pickup apparatus according to claim 1, wherein a grating which has said grating pattern is a relief-type diffraction grating,
    the ratio of a projecting portion width or a recessed portion width to a grating pitch of said relief-type diffraction grating being smaller than ½ in the center portion, and being almost ½ in the side portions.

3. An optical pickup apparatus according to claim 1, wherein a grating which has said grating pattern is a relief-type diffraction grating,
    a depth of a recessed portion of the relief-type diffraction grating in said center portion being smaller than that of the recessed portion of the relief-type diffraction grating in said side portions.

4. An optical pickup apparatus according to claim 1, wherein a grating which has said grating pattern is split into three parts in a direction normal to the grating pattern, and has one center portion and two side portions.

5. The optical apparatus of claim 1, wherein the surface with the grating pattern is closer to the light source than the surface with the hologram pattern; and the hologram pattern comprises two regions of periodical fine grooves with the two regions divided by a center line.

6. An optical pickup apparatus comprising:

a light source;

a transparent element which has a diffraction means having a grating pattern for separating a light beam from said light source into a zero-order diffracted beam and plus and minus first-order diffracted beams, said grating pattern is formed on one surface of said transparent element, said grating pattern having a center portion and at least one side portion, an efficiency of said center portion for a zero-order diffracted beam being greater than the efficiency of said side portions for the zero-order diffracted beam, and said transparent element having a hologram pattern for diffracting a light beam incident thereon from the outside, said hologram pattern being formed on an other surface opposite to said one surface, wherein a recessed portion of the diffraction means is formed into a rectangular shape in a plan view which has a width or depth changing stepwise between said center portion and said side portion to obtain the stepwise change of the transmittance of the diffraction means.

7. An optical pickup apparatus according to claim 6, wherein said diffraction means is relief-type diffraction grating, the ratio of a projecting portion width or a recessed portion width to a grating pitch of said relief-type diffraction grating being smaller than ½ in the center portion, and being almost ½ in the side portions.

8. An optical pickup apparatus according to claim 6, wherein said diffraction means is a relief-type diffraction grating, a depth of a recessed portion of the relief-type diffraction grating in said center portion being smaller than that of the recessed portion of the relief type diffraction grating in said side portions.

9. An optical pickup apparatus according to claim 6, wherein said diffraction means is split into three parts in a direction normal to the grating pattern, and has one center portion and two side portions.

10. The optical apparatus of claim 6, wherein the surface with the grating pattern is closer to the light source than the surface with the hologram pattern; and the hologram pattern comprises two regions of periodical fine grooves with the two regions divided by a center line.

11. An optical pickup apparatus comprising:

a light source for emitting light beams;

convergence means for converging light beams emitted from said light source on a recording medium;

photodetector means for detecting a reflected light from said recording medium;

first diffraction means which is present in a light path to said recording medium from said light source for leading the reflected light from said recording medium to said photodetector means;

second diffraction means which is present in the light path to said first diffraction means from said light source for splitting a light beam from said light source into a zero-order diffracted beam and plus and minus first-order diffracted beams, said second diffraction means having a center portion and at least one side portion, the zero-order beam diffraction efficiency through said center portion being greater than the zero-order beam diffraction efficiency through said side portion; and an optical transparent substrate having a first and second opposite disposed surfaces wherein said first diffraction means is formed on a first surface of the optically transparent substrate, and said second diffraction means is formed on a second surface of the optically transparent substrate, wherein a recessed portion of the second diffraction means is formed into a rectangular shape in a plan view which has a width or depth changing stepwise between said center portion and said side portion to obtain the stepwise change of the transmittance of the second diffraction means.

12. An optical pickup apparatus according to claim 11, said center portion is surrounded by said side portions.

13. An optical pickup apparatus according to claim 11, wherein said second diffraction means is a relief-type diffraction grating, the ratio of a projecting portion width or a recessed portion width to a grating pitch of said relief-type diffraction grating being smaller than ½ in the center portion, and being almost ½ in the side portions.

14. An optical pickup apparatus according to claim 11, wherein said second diffraction means is a relief-type diffraction grating, a depth of a recessed portion of the relief-type diffraction grating in said center portion being smaller than that of the recessed portion of the relief-type diffraction grating in said side portions.

15. An optical pickup apparatus according to claim 11, wherein said second diffraction means is split into three parts in a direction normal to the grating pattern, and has one center portion and two side portions.

16. The optical apparatus of claim 11, wherein the surface with the grating pattern is closer to the light source than the surface with the hologram pattern; and the hologram pattern comprises two regions of periodical fine grooves with the two regions divided by a center line.

17. An optical pickup apparatus according to claim 1, 6, or 11, wherein the ratio of the efficiency of said side portions for the zero-order diffracted beam to the efficiency of said center portion for the zero-order diffracted beam is 0.34.

18. An optical pickup apparatus comprising:

a light source for emitting light beams;

a transparent element having at least two opposed surfaces and having a grating pattern for separating a light beam from said light source into three beams, the first a zero-order diffracted beam, a second and third beams being plus and minus first-order diffracted beams, the grating pattern formed on one of said surfaces, means to focus said three beams on an information recording medium having recording tracks, so that information stored in the recording tracks can be detected by photodetector means, said grating pattern having a center portion and at least one side portion, an efficiency of said center portion for the zero-order diffracted beam being greater than an efficiency of said side portion for the zero-order diffracted which corresponds to the direction of the recording tracks, and said transparent element having a hologram pattern for diffracting a light beam incident thereon from the outside, said hologram pattern being formed on another surface opposite to said one surface, wherein the ratio of an area of a light beam incident upon said center portion to that of a light beam incident upon said side portions is 1.13.

19. An optical pickup apparatus according to claim 18, wherein the ratio of the efficiency of said side portions of the zero-order diffracted beam to the efficiency of said center portion for the zero-order diffracted beam is 0.34.

20. An optical pickup apparatus comprising:

a light source;

a transparent element which has a diffraction means having a grating pattern for separating a light beam from said light source into a zero-order diffracted beam and plus and minus first-order diffracted beams, said grating pattern is formed on one surface of said transparent element, said grating pattern having a center portion and at least one side portion, an efficiency of said center portion for a zero-order diffracted beam being greater than the efficiency of said side portions for the zero-order diffracted beam, and said transparent element having a hologram pattern for diffracting a light beam incident thereon from the outside, said hologram pattern being formed on another surface opposite to said one surface, wherein the ratio of an area of a light beam incident upon said center portion to that of a light beam incident upon said side portions is 1.13.

21. An optical pickup apparatus comprising:

a light source for emitting light beams;

convergence means for converging light beams emitted from said light source on a recording medium;

photodetector means for detecting a reflected light from said recording medium;

first diffraction means which is present in a light path to said recording medium from said light source for leading the reflected light from said recording medium to said photodetector means;

second diffraction means which is present in the light path to said first diffraction means from said light source for splitting a light beam from said light source into a zero-order diffracted beam and plus and minus first-order diffracted beams, said second diffraction means having a center portion and at least one side portion, the zero-order beam diffraction efficiency through said center portion being greater than the zero-order beam diffraction efficiency through said side portion; and an optical transparent substrate having a first and second opposite disposed surfaces wherein said first diffraction means is formed on a first surface of the optically transparent substrate, and said second diffraction means is formed on a second surface of the optically transparent substrate, wherein the ratio of an area of a light beam incident upon said center portion to that of a light beam incident upon said side portions is 1.13.

* * * * *